March 15, 1927.
C. EWING
1,621,480
TESTING SYSTEM
Filed Aug. 31, 1926
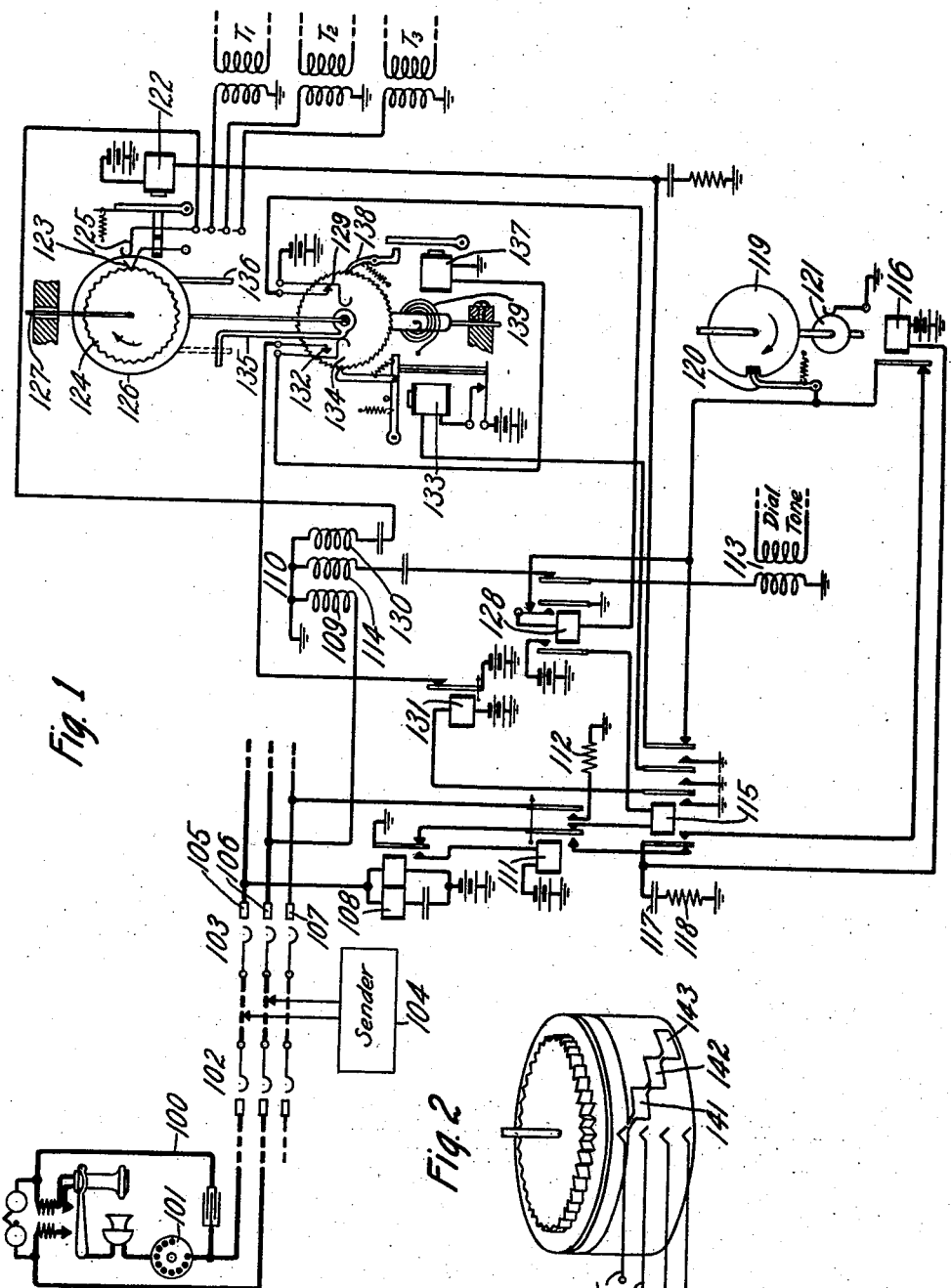
INVENTOR
Claude Ewing
BY
ATTORNEY Patented Mar. 15, 1927.

1,621,480

UNITED STATES PATENT OFFICE.

CLAUDE EWING, OF BROOKLYN, NEW YORK, ASSIGNOR TO AMERICAN TELEPHONE AND TELEGRAPH COMPANY, A CORPORATION OF NEW YORK.

TESTING SYSTEM.

Application filed August 31, 1926. Serial No. 132,825.

This invention relates to automatic telephone exchange systems and more particularly to the testing of impulse transmitters located at subscribers' substations. Heretofore when it was desired to test the accuracy of impulse transmitters or dials it was necessary to remove them from the substation to the central office. A device for testing dials in this manner is disclosed in United States Patent 1,391,947, granted to E. W. Gent, September 27, 1921.

In accordance with the present invention an impulse transmitter at a subscriber's substation may be associated with a testing device located at a central office by means of the central office switching apparatus without the intervention of an operator. When so associated, the testing device may be controlled from the substation to test the accuracy of the transmitter and return to the substation a characteristic tone to indicate whether the dialing speed is correct or not.

In the embodiment of the invention illustrated, it is possible by dialing a particular number to set the district selector in a panel type office, or any convenient selector in other types of machine switching offices, on a test line. This test line is connected with a pulsing relay which responds to additional dial impulses. A dial tester is arranged to be released in response to the first of a series of impulses and locked in response to the last of a predetermined number of pulses, counting means being provided under the control of the pulsing relay. When the dial tester is stopped, one of a plurality of circuits is closed for transmitting a tone characteristic of the position assumed by the dial tester over the established connection through the receiver at the substation at which the dial under test is located. The dial tester is calibrated so that the tones transmitted indicate a fast, a slow, or a correct dial. Following each test the dial tester is reset ready for the next test.

In the drawing, Figure 1 shows in detail, a subscriber's substation circuit and a test line circuit for controlling the dial tester. The switches for connecting the substation with the dial tester circuit are indicated schematically. Fig. 2 is a side view of the dial tester showing the arrangement of brushes and conducting segments for closing the tone circuits.

The dial tester employed in the present embodiment of the invention consists of a heavy disc 126 suitably mounted on a wire 127. A pin 136 and arm 135 permit the pendulum disc 126 to be rotated against the torsion of the mounting wire, while the toothed wheel 124 and stop pawl 123 serve to hold the pendulum in position after rotation. The pawl 123 is controlled by the stop magnet 122. In the above mentioned Gent patent, manual means is provided for operating an arm similar to arm 135. In the present instance arm 135 is rotated by means of ratchet wheel 134 under the control of stepping magnet 133. Arm 135 in its extreme positions controls contacts included in the operating circuit.

The disc 126 in addition to being suitably calibrated is provided with conducting segments 140, 141, 142 and 143, as shown in Fig. 2, which are insulated from the remainder of the pendulum and are themselves electrically connected. Brushes 125, 144, 145 and 146 rest upon the disc when magnet 122 is deenergized. These brushes are aligned, while the segments 141, 142 and 143 are offset so that brush 125 will be electrically connected to only one of the brushes 144, 145 and 146 in a given position of the pendulum. It is obvious that other arrangement of the brushes and segments may be used, it being merely necessary that only one circuit be completed at a time.

The dial tester is so designed that the pendulum will swing through somewhat less than 180° in one second which is the approximate time consumed by a dial in sending out ten pulses. The disc is calibrated so that the exact position occupied by the disc at the end of ten pulses from a correct dial, and the limits above and below this which are satisfactory, may be determined. When these points have been determined the conducting segments are so located that segment 142 covers an arc on the disc corresponding to satisfactory operation and segments 141 and 143 cover arcs at either side thereof. If pulses are sent out too rapidly, the pendulum will not swing as far as the satisfactory position and brush 144 will make contact with segment 141 when the pendulum is arrested. If pulses are sent out too slowly, the pendulum will swing beyond the satisfactory position before it is arrested and brush 146 will make contact with segment 143. These brushes are mounted in any suitable manner so that they may be lifted, say by magnet 122, from the disc while it is swinging and are released to make contact when the disc is stopped. Brushes 144, 145 and 146 are connected to the secondary windings of tone coils $T_1$, $T_2$ and $T_3$, respectively, which tones differ from each other and hence are characteristic of the position of the pendulum disc and of the speed of the dial.

When a test man at a subscriber's station 100 desires to test the dial 101 to determine whether or not it operates at the correct speed, he will first operate the dial to transmit a special code which is reserved for making such tests. The central office apparatus, including line finder 102, district selector 103 and sender 104 will function to extend the line of substation 100 to a test line appearing before the district selector 103, in terminals 105, 106 and 107. A circuit is thereupon completed from battery, through the right winding of relay 108, over tip terminal 105, and the tip conductor through selector 103, line finder 102, and the subscriber's loop, back over the ring conductor through the switching apparatus to ring terminal 106, winding 109 of transformer 110 to ground. As soon as the brushes come to rest on the terminals of the test line, a tone induced in the secondary winding of transformer 113 will set up a tone current in winding 114 of transformer 110 which will in turn induce a tone in winding 109 and hence in the circuit including the substation. The operation of relay 108 closes an obvious circuit for relay 111 which connects ground through the resistance 112 over the outer right front contact of relay 111, to sleeve terminal 107, preventing the selection of the dial tester test line by any other selector.

When the test man hears the dial tone he will operate dial 101 to transmit the digit zero thereby interrupting the line circuit ten times. At each interruption, relay 108 releases and opens the circuit of relay 111 but this relay is slow to release and does not open its contacts during dial pulses. A circuit is therefore closed, at each closure of the back contact of relay 108, extending from ground over the back contact of relay 108, inner right front contact of relay 111, left back contact of relay 115, winding of stepping magnet 116 to battery. The grounded condenser 117 and resistance 118 serve to reduce sparking at the relay contacts when the circuit is opened. Magnet 116 controls a counting device whereby the desired operations may take place following the reception of a predetermined number of pulses. In the present disclosure, this takes the form of the disc 119 having such dimensions and controlled by magnet 116 in such a way that pawl 120, which normally rests on an insulating segment of disc 119, will complete a connection with ground through discs 119 and 121 throughout the reception of pulses 2 to 9, inclusive, and will again rest upon an insulated segment following the reception of the tenth pulse. As soon as disc 119 rotates, in response to the operation of magnet 116 following the first closure of the circuit of that magnet, a circuit is completed from ground, through discs 121 and 119, pawl 120, right back contact of relay 115, winding of stop magnet 122 to battery. The operation of magnet 122 removes pawl 123 from engagement with the toothed disc 124 and also lifts the tone brushes represented by brush 125 from contact with the disc 126. Disc 126 is normally held against the tension of the mounting wire 127, and is ready to swing as soon as pawl 123 is withdrawn. It will immediately start to rotate in the direction of the arrow. The disc 126 is positioned against the tension of wire 127 after each operation thereof, as hereinafter described.

A circuit is also closed from ground, through pawl 120, right normal contact and winding of relay 128, contact 129, to battery. Relay 128 locks over its right front contact to ground opening the dial tone circuit and preparing a circuit for relay 115.

When the tenth pulse has been received pawl 120 will again rest on an insulated segment of disc 119 and the circuit of stop magnet 122 will be opened. Stop 123 will engage wheel 124 and hold the pendulum disc in position. One of the brushes indicated by brush 125 will make contact with a conducting segment on the face of the disc 126 as above described, and a tone will be transmitted from one of the sources $T_1$, $T_2$ or $T_3$ over brush 125, winding 130 of transformer 110 to ground, thus inducing in winding 109 and the line circuit a tone indicative of the speed of the dial.

The test man will then restore the receiver to the switchhook, releasing the connection and permitting relay 108 to close its back contact long enough so that relay 111 also retracts its armature. A circuit will then be closed from battery, over the left contact of relay 128, winding of relay 115, back contacts of relays 111 and 108 to ground. Relay 115 closes an obvious circuit for relay 131 which is slow to release and which disconnects battery from contact 132. It also closes a circuit for magnet 133 which is completed through the contact controlled by that relay to battery so that relay 133 operates in a self-interrupted circuit to rotate disc 132 against the tension of spring 139. As disc 134 rotates, arm 135 engages pin 136 on the pendulum disc and rotates the pendulum in the direction opposite to that of the arrow. The operation of relay 115 also closes a circuit for magnet 122 so that pendulum 126 is free to move under the control of arm 135. When arm 135 leaves the position shown, it closes contact 132 preparing the circuit of magnet 137. While the disc 134 rotates, the latch 138 slides over the teeth of disc 134 but prevents its returning under the tension of spring 139. When disc 134 has rotated 180° carrying pendulum 126 to its set position, arm 135 opens contact 129, releasing relay 128 which in turn releases relay 115. The release of relay 115 opens the circuit of magnet 122 which permits stop 123 to engage wheel 124 and hold the pendulum in position. The release of relay 128 recloses the tone circuit but since no circuit is completed in series with winding 109, it is ineffective. After an interval, determined by the slow-to-release character of relay 131, a circuit is completed from battery, over the back contact of relay 131, through contact 132, winding of magnet 137 to ground. Magnet 137 operates, withdrawing pawl 138 from the teeth of ratchet 134 permitting it to restore under the control of spring 139. When arm 135 has returned to the position shown, it opens contact 132, releasing the magnet 137 whereupon latch 138 holds disc 134 in its normal position. The dial tester is now normal and may be reoperated again by selecting the test line.

While a torsion pendulum type of dial tester has been shown, it is clear that other types of testers as well as other types of counting apparatus and connecting means are within the contemplated scope of the invention. Moreover, it is to be understood that testing devices of this character may have application to systems other than telephone systems.

What is claimed is:

1. In a testing system for testing impulse transmitters located at subscribers' stations, a testing device arranged to be automatically associated with a transmitter in response to the initial operation thereof and responsive to further operation of said transmitter for testing the same.

2. In a telephone exchange system, a test circuit, a telephone circuit, an impulse transmitter associated with said telephone circuit, means under the control of said impulse transmitter to connect said telephone circuit with said test circuit, and means associated with said test circuit to determine the speed of pulsing of said transmitter.

3. In a telephone exchange system, a test circuit, a telephone circuit, an impulse transmitter associated with said telephone circuit, means for connecting said test circuit with said telephone circuit, means associated with said test circuit controllable over said telephone circuit to determine the speed of pulsing of said transmitter, and means to transmit a signal over said telephone circuit to indicate said speed.

4. In a telephone exchange system, a test circuit, a telephone circuit, an impulse transmitter associated with said telephone circuit, means under the control of said impulse transmitter to connect said test circuit with said telephone circuit, means associated with said test circuit to determine the speed of pulsing of said transmitter, and means to transmit a signal over said telephone circuit to indicate said speed.

5. In a telephone exchange system, a test circuit, a telephone circuit, an impulse transmitter associated with said telephone circuit, means under the control of said impulse transmitter to connect said telephone circuit with said test circuit, said test circuit including means to determine the speed of pulsing of said transmitter, and means to transmit a characteristic tone over said telephone circuit to indicate said speed.

6. In a testing system for testing impulse transmitters in subscriber's station apparatus associated with a central office, a testing device located in said central office, means under the control of one of said impulse transmitters to connect it with said testing means, and means to operate said testing device under the control of said impulse transmitter to determine the speed of pulsing of said transmitter.

7. In a testing system for testing impulse transmitters in subscriber's station apparatus associated with a central office, a testing device located in said central office, means under the control of one of said impulse transmitters to connect it with said testing means, means to operate said testing device under the control of said impulse transmitter to determine the speed of pulsing of said transmitter, and means to transmit a signal to the station at which said transmitter is located to indicate said speed.

8. In a testing system, for testing impulse transmitters in subscriber's station apparatus associated with a central office, a testing device located in said central office, means under the control of one of said impulse transmitters to connect it with said testing means, means to operate said testing device under the control of said impulse transmitter to determine the speed of pulsing of said transmitter, means to transmit a signal to the station at which said transmitter is located to indicate said speed, and means operated on the release of said connecting means to prepare said testing device to test another impulse transmitter.

9. In a telephone exchange system, a test circuit, a dial tester, a telephone circuit, a dial associated with said telephone circuit, means under the control of said dial to connect said telephone circuit with said test circuit, means responsive to dial impulses to start said dial tester, means operated following a predetermined number of pulses to stop said dial tester, and means to transmit a signal in accordance with the position of said dial tester.

10. In a telephone exchange system, a test circuit, a dial tester, a telephone circuit, a dial associated with said telephone circuit, means under the control of said dial to connect said telephone circuit with said test circuit, means responsive to dial impulses to start said dial tester, means operated following a predetermined number of pulses to stop said dial tester, means to transmit a signal in accordance with the position of said dial tester, and means operated on the release of said connecting means to reset said dial tester.

11. In a telephone exchange system, a test circuit, a dial tester including a pendulum, a telephone circuit, a dial associated with said telephone circuit, means under the control of said dial to connect said telephone circuit to said test circuit, means responsive to dial pulses to release said pendulum and to arrest said pendulum following a predetermined number of pulses to determine the speed of pulsing of said dial, a plurality of tone sources, means under the control of said pendulum to transmit a tone from one of said sources to said telephone circuit to indicate the speed of said dial, and means operated on the release of said connecting means to reset said pendulum.

12. The method of testing impulse transmitters at subscribers' stations associated with a central office which comprises operating an impulse transmitter to associate it with testing apparatus at the central office, reoperating said impulse transmitter, automatically timing a predetermined number of pulses during the reoperation of said impulse transmitter, and transmitting a signal characteristic of the time consumed.

13. The method of testing dials at subscribers' stations associated with a central office which comprises operating a dial to associate it with testing apparatus at said central office, reoperating said dial to transmit pulses for test, automatically starting a timing device at the first of said pulses, automatically stopping the timing device at the last of said pulses, transmitting a signal characteristic of the time consumed, and resetting said timing device.

In testimony whereof, I have signed my name to this specification this 28th day of August, 1926.

CLAUDE EWING.